US009638826B2

United States Patent
Sokolowsky et al.

(10) Patent No.: US 9,638,826 B2
(45) Date of Patent: May 2, 2017

(54) METHOD USING NEAR AND FAR FIELD ULF AND ELF INTERFEROMETRY SYNTHETIC APERTURE RADAR FOR SUBSURFACE IMAGING

(71) Applicant: Deep Imaging Technologies Inc., Tomball, TX (US)

(72) Inventors: James Sokolowsky, Tomball, TX (US); Robert Payton, Tomball, TX (US); Trevor Pugh, Tomball, TX (US); Alexander Kalish, Tomball, TX (US); Mark Hickey, Tomball, TX (US)

(73) Assignee: Deep Imaging Technologies Inc., Tomball, TX (US)

( * ) Notice: Subject to any disclaimer, the term of this patent is extended or adjusted under 35 U.S.C. 154(b) by 125 days.

(21) Appl. No.: 14/401,768

(22) PCT Filed: May 17, 2013

(86) PCT No.: PCT/US2013/041691
§ 371 (c)(1),
(2) Date: Nov. 17, 2014

(87) PCT Pub. No.: WO2013/173782
PCT Pub. Date: Nov. 21, 2013

(65) Prior Publication Data
US 2015/0123835 A1 May 7, 2015

Related U.S. Application Data

(60) Provisional application No. 61/648,305, filed on May 17, 2012.

(51) Int. Cl.
*G01V 3/12* (2006.01)
*G01V 3/38* (2006.01)
(Continued)

(52) U.S. Cl.
CPC ............... *G01V 3/12* (2013.01); *G01V 3/083* (2013.01); *G01V 3/38* (2013.01); *G01V 2003/086* (2013.01)

(58) Field of Classification Search
CPC . G01V 3/08; G01V 3/083; G01V 3/12; G01V 3/36; G01V 3/38; G01V 2003/086;
(Continued)

(56) References Cited

U.S. PATENT DOCUMENTS 3,909,827 A * 9/1975 Tricoles .................. G01S 13/89
342/179
4,717,916 A * 1/1988 Adams .................... G01S 13/89
342/107
(Continued)

FOREIGN PATENT DOCUMENTS

| WO | 2008013609 A2 | 1/2008 |
| WO | 2008085063 A1 | 7/2008 |
| WO | 2010148170 A2 | 12/2010 |

OTHER PUBLICATIONS

International Search Report received in corresponding PCT Application No. PCT/US2013/041691, dated Oct. 21, 2013, 2 pages.
(Continued)

*Primary Examiner* — Bernarr Gregory
(74) *Attorney, Agent, or Firm* — Blank Rome, LLP

(57) ABSTRACT

This invention relates to devices and processes for geophysical prospecting, subsurface fluid monitoring and, more particularly, to the use of interferometric techniques using Control Source Electromagnetic ("CSEM") and Magnetoturelic ("MT") signals to create images of sub-surface structures and fluids.

14 Claims, 7 Drawing Sheets

(51) Int. Cl.
*G01V 3/08* (2006.01)
*G01V 3/00* (2006.01)

(58) Field of Classification Search
CPC ... G01V 1/28; G01V 1/36; G01V 1/37; G01S 7/52; G01S 7/52003; G01S 13/88; G01S 13/89; G01S 13/9023
See application file for complete search history.

(56) References Cited

U.S. PATENT DOCUMENTS

| | | | | |
|---|---|---|---|---|
| 4,926,392 | A * | 5/1990 | Handley | G01V 1/37 367/41 |
| 5,160,931 | A * | 11/1992 | Brown | G01S 13/9023 342/25 C |
| 5,327,139 | A * | 7/1994 | Johnson | G01S 13/90 342/22 |
| 5,835,054 | A * | 11/1998 | Warhus | G01V 3/12 342/179 |
| 5,920,285 | A * | 7/1999 | Benjamin | G01S 13/89 342/22 |
| 6,130,641 | A * | 10/2000 | Kraeutner | G01S 7/52003 342/176 |
| 6,339,333 | B1 * | 1/2002 | Kuo | G01V 3/12 324/337 |
| 6,624,781 | B1 * | 9/2003 | Collins | G01S 13/89 342/179 |
| 7,548,185 | B2 * | 6/2009 | Sheen | G01S 13/89 342/22 |
| 2009/0302849 | A1 | 12/2009 | Vasconcelos et al. | |
| 2010/0176791 | A1 | 7/2010 | Dickens et al. | |
| 2011/0087435 | A1 | 4/2011 | Hornbostel | |
| 2012/0010818 | A1 | 1/2012 | Kalish | |

OTHER PUBLICATIONS

Jing-song, S., et al., (2009), "Development and Enlightenment of Controlled-Source Electromagnetic (CSEM) Surveying Method in Marine Oil/Gas Exploration", Oil Geophysical Prospecting, vol. 44, No. 1 pp. 119-127.

Fan, Y., et al., (2009), "3-D Controlled Source Electromagnetic Interferometry by Multidimensional Deconvolution", Department of Geophysics and Center for Wave Phenomena, Colorado School of Mines, pp. 41-50.

Slob, E., et al., (2007), "Interferometric Electromagnetic Green's Functions Representations Using Propagation Invariants", Geophys. J. Int., vol. 169, pp. 60-80.

Wapenaar, K., et al., (2011), "Seismic Interferometry by Crosscorrelation and by Multidimensional Deconvolution: A Systematic Comparison", Geophys. J. Int., vol. 185, pp. 1335-1364.

Fan, Y., (2010), "Virtual Source Methods for Diffusive Fields: Applications of Interferometry and Synthetic Aperature to Controlled Source Electromagnetics (CSEM)", PhD Thesis of the Colorado School of Mines, pp. 1-143.

European Search Report received in corresponding EP Application No. 13790581.6, dated Mar. 3, 2016, 10 pgs.

* cited by examiner

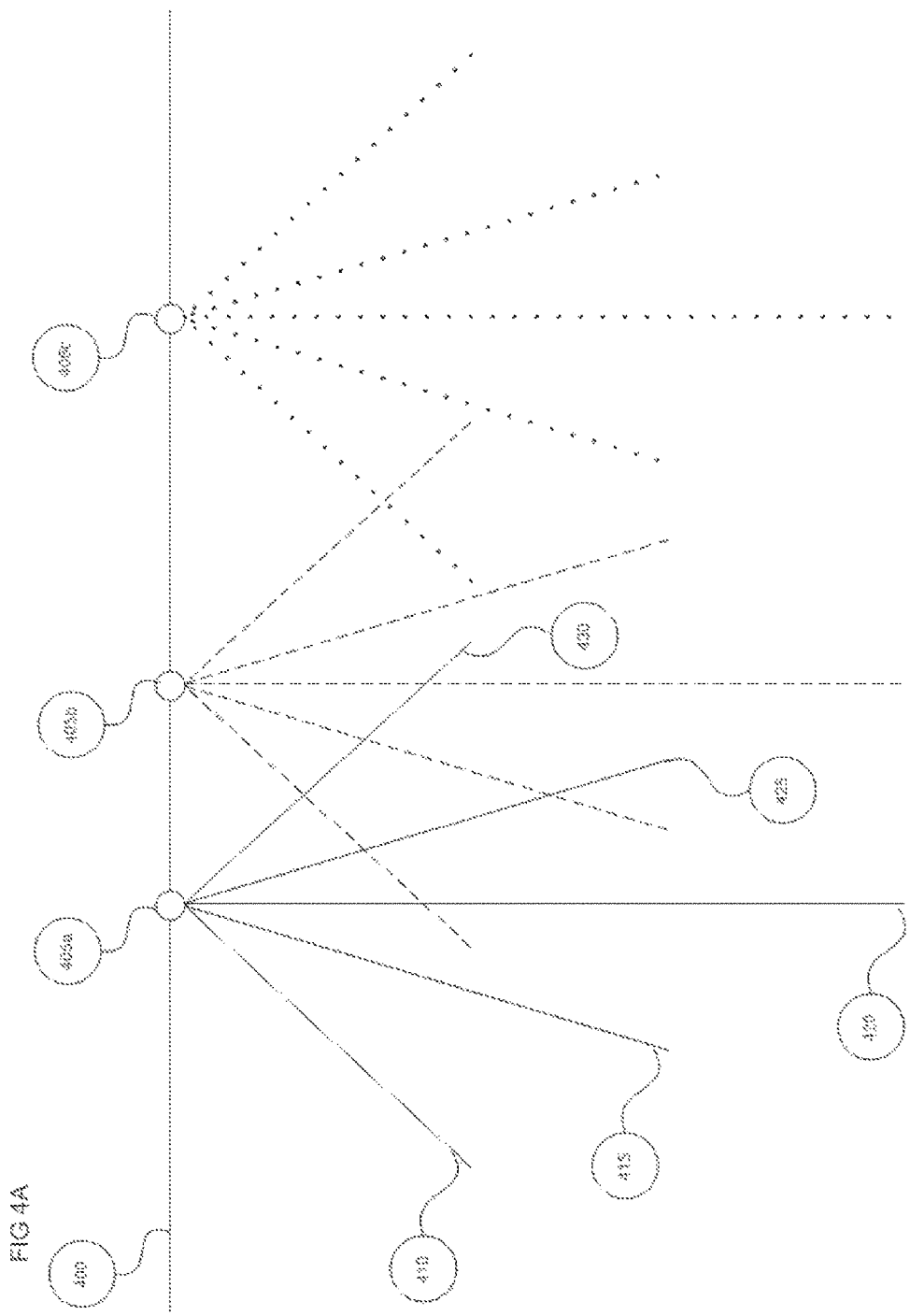

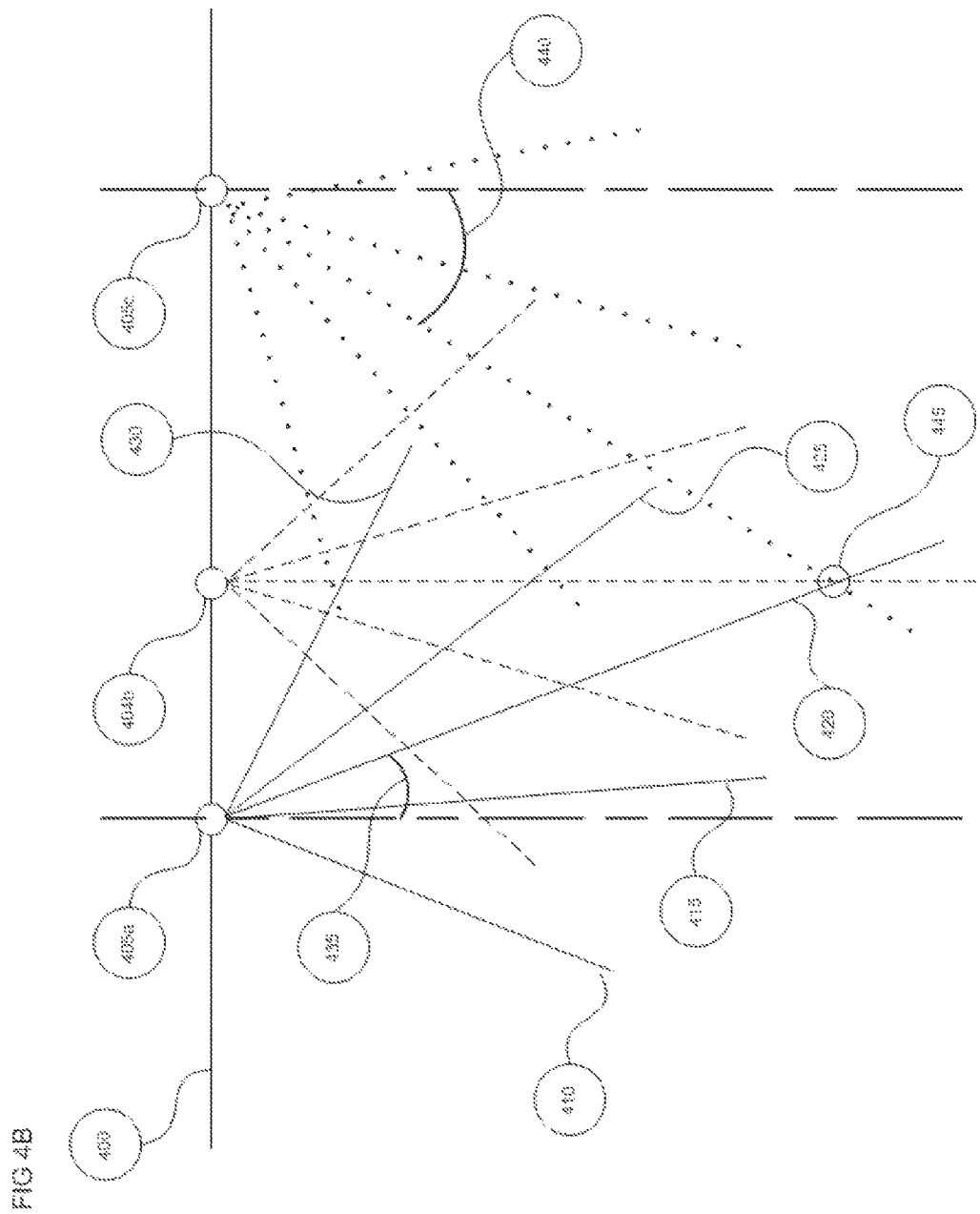

METHOD USING NEAR AND FAR FIELD ULF AND ELF INTERFEROMETRY SYNTHETIC APERTURE RADAR FOR SUBSURFACE IMAGING

FIELD OF THE INVENTION

The invention relates to devices and processes for geophysical prospecting, subsurface fluid monitoring and, more particularly, to the use of interferometric techniques using Control Source Electromagnetic ("CSEM") and Magnetoturelic ("MT") signals to create images of sub-surface structures and fluids.

BACKGROUND OF THE INVENTION

The current state of the art involves using processes that depend on listening devices, such as hydrophones, placed in an adjacent parallel well, or co-located around the well of interest. This method is commonly referred to as Micro Seismic Monitoring (MSM) and is typified by U.S. Pat. No. 7,872,944 and is incorporated herein by reference.

The MSM technique has several basic flaws. (a) The method is a secondary indicator of the actual fluid location and extent within the sub-surface formation. (b) The method does not indicate if the proppant has been successfully introduced into the sub-surface formation. (c) The method does not report any information relating to the quality of the fluid present or fractures in the formation, as might be defined by measurements of porosity and conductivity. (d) There are intricate procedures required to move and relocate the sensor arrays for each sub-surface depth at which the fracturing operation that occurs.

There is also a speculative patent application, Controlled Source Fracture Monitoring US 2010/0147512, that describes how the process might operate using CSEM but not the method or techniques required to produce usable imaging data.

The proposed method in US 2010/0147512 Cramer et al, has several basic flaws. (a) In Cramer et al, the method requires a proppant that is modified to enhance its electromagnetic (EM) properties. (b) The proposed method in Cramer et al, requires an active transmitter to use CSEM or a very long period of data collection in order to use the TM method. (c) There is a requirement in Cramer et al, to electrically conduct the signal to the formation through the tubing, casing, or a wireline tool. (d) There are practical implications in Cramer et al, related to the method of transferring or coupling the excitation pulse to the formation, that limit the method proposed to only operating before or after the fracturing operation occurs. In Cramer et al, the amount of power required will be significant and introducing this power during fracturing operations will be fraught with problems. The power will directly control the depth of investigation and this may prove to be a limitation. (f) In Cramer et al, there is no discussion of the process of tuning the antenna to the tubing and surrounding formation to ensure good coupling of the AC signal. It is likely that without the critical step of tuning the antenna to the surrounding formation, the antenna will not couple reliably with the formation, resulting in inconsistent results and possible transmitter output stage failure, due to reflected signal from the formation. (g) The references that are supposed to teach the examiner about certain aspects of the invention do not discuss the mathematical issues relating to the position and polarization of the antenna which must be known for the current data inversion techniques referenced, to achieve convergence. It is intrinsic to the method stated in Cramer et al, that this information will be unknown and dependent on the shape and size of the tubing and the area over which the proppant and fluid have migrated in the formation, during the fracturing operation.

The interferometric technique has been used generally in many unrelated areas such as Magnetic Resonance Imaging ("MRI") for medical imaging, Astrophysics in Baseline Radio Astronomy Imaging, Synthetic Aperture Radar ("SAR") to image the earth's surface, Ground Penetrating Radar ("GPR") and Interferometric SAR, (InSAR or IFSAR). Each of these systems is using distinct parts of the electromagnetic spectrum but none has been successfully applied to CSEM. In fact, most practitioners of the art expect interference fringes to contain many multiples of pi phase shift across an image; however, as will be discussed further below, this is not the case with the disclosed subject matter. There are a few patents that are relevant as follows: US 2009/0302849 A1 for describing a modeling approach to the problem using Greens Theorem. ELECTROMAGNETIC EXPLORATION IVAN VASCONCELOS et al, which is hereby incorporated by reference in its entirety. There are also several papers that discuss the interferometry techniques as it applies to CSEM these are: Seismic interferometry by crosscorrelation and multi-dimensional deconvolution: a systematic comparison by Wapenaar et al which is hereby incorporated by reference in its entirety, and 3D synthetic Aperture for Diffuse Fields by Knaak et al 3 Oct. 2012 which is hereby incorporated by reference in its entirety. It is important to note that the latter of these two papers limits its investigation to existing marine CSEM data 0.25 Hertz.

The techniques of interferometry are well understood at higher frequencies but have been given little attention at low frequencies.

Interferometry Synthetic Aperture Radar (IFSAR) is a known technique that uses signal processing to improve resolution beyond the limitation of physical antenna aperture—examples of this technique are described SAR Marine User's Manual by Samuel W McCandless Jr. and Christophe R Jackson, which is hereby incorporated by reference in its entirety. One of the issues associated with this technique is the phase unwrapping error due to the Doppler effect, as disclosed in BASIC PRINCIPLES AND CURRENT ISSUES OF SAR INTERFEROMETRY by Olaf Hellwich, which is hereby incorporated by reference in its entirety. In the IFSAR technique, fixed interval measurements are collected from a linear deployment of receivers and are used to 'synthesize' a very long antenna. IFSAR allows the possibility of using longer wavelengths and still achieving good resolution with antenna structures of reasonable size. Combined with phase data, theoretically any resolution may be obtained.

Recent advances in noise reduction and phase accuracy in multi component CSEM receivers allow for additional improvements that result in significant in field resolution improvements. Such methods and systems are disclosed in U.S. Pat. Pub. No. 2012/0010818 filed on Jul. 7, 2011 and which is hereby incorporated by reference and U.S. Provisional Pat. No. 61/648,305 filed on May 17, 2012 which is incorporated by reference.

The concept of Pseudo Random Binary ("PRB") codes as used in spread spectrum wireless transmission schemes is well understood. A description of a proposed system for near surface investigation using PRB codes can be found in U.S. Pat Pub No. 2010/0102822 filed on Dec. 26, 2009 and is hereby incorporated by reference. The Publication No. 2010/

0102822 contains several restrictions that prevent its operation in the application envisioned herein; the most important is that of using short PRB codes. Using short PRB codes severely limits the effective depth (e.g. less than 300 m). To reach useful depths (e.g. over 300 m to 3,000 m+), the code must be much longer and transmitted with much greater power. The paper: The development and applications of a wideband electromagnetic sounding system using a pseudo-noise source by P. M. Duncan et al presented to the SEG in 1980 describes a similar PRB system and is included herein in its entirety.

There are several problems with current CSEM techniques that limit the ability to interpret the images created. These problems occur because the current systems generate images with large spatial uncertainty. In an effort to alleviate this problem most practitioners of the current art use complicated signal processing methods that involve modeling and inversion with other data sets, such as seismic data, in order to constrain the results. Inevitably the method leads to imprecise and uncertain conclusions.

BRIEF SUMMARY OF THE INVENTION

The disclosed subject matter relates to devices and processes for geophysical prospecting, subsurface fluid monitoring and, more particularly, to the use of interferometric techniques using Control Source Electromagnetic ("CSEM") and Magnetoturelic ("MT") signals to create images of sub-surface structures and fluids.

It is an object of the disclosed subject matter to have particular application in the monitoring of subsurface fluids introduced during a hydraulic fracturing or liquid petroleum gas (LPG) sub-surface fracturing operations. A person skilled in the art of sub-surface fracturing operations will understand the importance of establishing the extent and quality of the fluid plume and interstitial proppant, as soon as possible, during or after a sub-surface fracturing operation. This has particular importance for ensuring that the fracturing process was successful and did not impinge on adjacent structures that might contain drinking water or the sub-surface mineral deposits of another party.

The disclosed subject matter provides a solution independent of the need to use inversion with seismic data. In one embodiment, a four step process is provided. Each of these steps can be used independently but a more complete image of the subsurface structure and contents will be achieved with all four processes in place.

The steps for this embodiment are: the step of collecting and processing data from PRB code transmission to provide near field phase velocities for the second step; the step of Radar sounding timing to provide depth information for the third step; the step of creating interferometric image of the target structure; the step of creating a "stack" of interferometric images into the near field domain, using the process of phase focusing.

Depth and phase velocity information can be obtained in other ways; such as using exiting well logs, geological strata maps and, in the case of hydraulic fracing, the precise location of the frac stage of interest. Each step makes use of an array of phase measuring receivers and the process of phase unwrapping.

An object of the disclosed subject matter is that it does not require a proppant that is modified to enhance its electromagnetic (EM) properties.

In addition to the methods in Cramer et al, which require an active transmitter to use CSEM or a very long period of data collection in order to use the TM method, it is an object of the disclosed subject matter to show that there is a third method that depends on another property of the formation that occurs during the fracturing process.

Another object of the disclosed subject matter is to allow for transmission of the excitation pulse from the surface with no intermediate wire to conduct the signal to the fracturing location.

Yet another object of the disclosed subject matter is to show that monitoring can occur throughout the operation and allow the user to immediately observe any possible problems as opposed to only operating before or after the fracturing operation occurs.

It is an object of the disclosed subject matter to provide a technique of interferometry and defuse wave interferometry that are new to the CSEM field.

It is an object of the disclosed subject matter to use a frequency higher than 0.25 Hz to create an acceptable resolution required for the disclosed subject matter to be effective.

It is yet another object of the disclosed subject matter to achieve optimum results from real-world interferometric application by fine-tuning the specific engineering implementation to match the unique characteristics and challenges posed by the targets and the characteristics of the probing waves (e.g. positioning of the receivers; positioning the transmitter in more than one location; phase steering; phase focusing; etc, to overcome difficult geologies that might mask, shadow, or otherwise occult the area of interest).

It is an object of the disclosed subject matter to reduce or eliminate the phase unwrapping error due to the Doppler effect by having the disclosed subject matter remain stationary when readings are taken.

It is an object of the disclosed subject matter to regain the intrinsic advantage of moving the source and receivers over a target area by using multiple transmitter positions and using a technique of phase focusing.

Yet another object of the disclosed subject matter is to allow for multiple transmitter positions.

It is an object of the disclosed subject matter to extend to the low frequency electromagnetic spectrum the use of interferometric techniques.

It is an object of the disclosed matter to overcome the hardware limitations of sample rate and ADC resolution by using the technique of data framing.

For the purposes of naming the disclosed subject matter, the term Defuse Wave Interferometric CSEM and Far Field Interferometry with CSEM will be referred to as "InCSEM." For the purposes of this application the electromagnetic ("EM") mode can be distinguished from the Induced Polarization ("IP") mode in that the Induced Polarization is a slow process involving the separation and recombination of charge and the EM mode is dependent on EM wave propagation and interactions with interfaces between materials of differing conductivities.

The present invention uses an altered and augmented form of baseline radio interferometry to achieve high subsurface spatial resolution using a reasonably small array of specialized receivers, their proprietary signal processing methods, and an imaging geometry as described herein.

BRIEF DESCRIPTION OF THE DRAWINGS

FIGS. 4a and 4b depicts an exemplary phase focusing according to an embodiment of the disclosed subject matter.

DETAILED DESCRIPTION OF THE INVENTION

Figure 1:
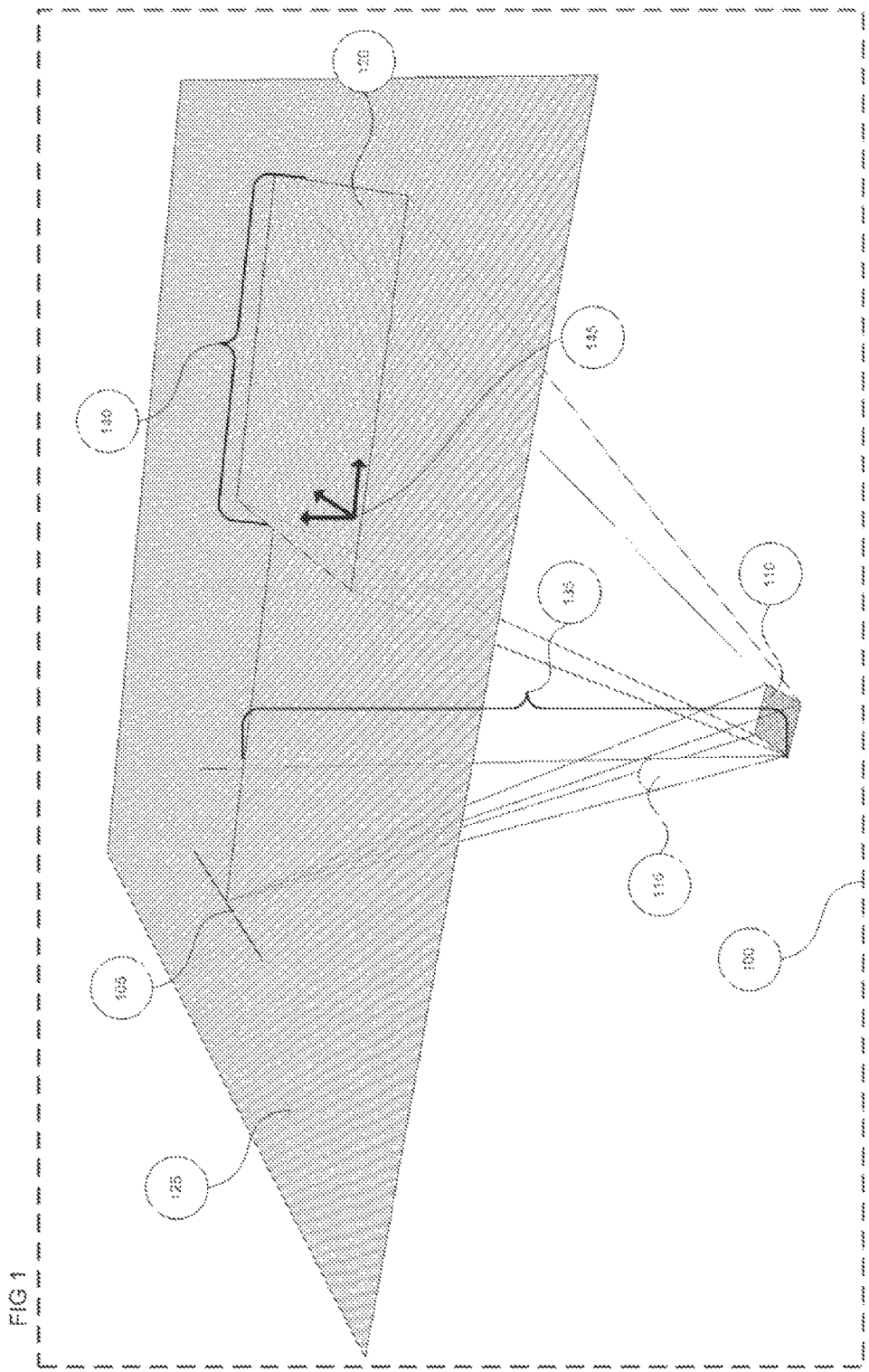
FIG. 1 depicts a typical source, object and receiver arrangement according to an embodiment of the disclosed subject matter.

The disclosed subject matter relates to the field of Controlled Source Electromagnetic Surveying (CSEM), and, more particularly, addresses various shortcomings in the technique related to resolution and locality. In operation, the disclosed subject matter provides systems and methods for imaging that combine ELF, or ULF electromagnetics with interferometry based synthetic aperture Radar techniques and controlled source electromagnetics with massive sampling through a data framing technique discussed below. Most practitioners of the art expect interference fringes to contain many multiples of pi phase shift across an image; however, this is not the case with the disclosed subject matter. In the area of interest and at the ELF and ULF frequency ranges, especially when frequencies of less than 10 Hz are used or very low conductivity formations are being probed, interference patterns will be very weak and will be constructed of less than pi interferences. The disclosed system is able to detect the small amplitude changes due to the small phase shifts present at the surface receiver array. Methods and systems are provided to combine conventional CSEM measurements of the H and E fields with the techniques of ULF and ELF Phased Array Radar employing IFSAR. The transmitter disclosed in U.S. Pat. Pub. No. 2012/0010818, is capable of ULF and ELF signal generation from a controlled current source to provide greater EM transmission accuracy in order to illuminate sub-surface geology with a near planar wave front. The output current, output voltage and transmitted waveforms are recorded at the transmitter; the time is also recorded from, for example, an atomic clock of great accuracy and resolution. The transmitter output waveform is synchronized and phase coherent to the clock. The clock is used to phase synchronize all transmitters and receivers. This function can be achieved, in one embodiment, by using a GPS synchronizing clock and referencing all system clocks to the GPS synchronizing clock.

In one embodiment a system of receivers and transmitters is arranged in a manner that increases the number of unique measurements that can be made and also reduces the uncertainty in an interferometric image or Radar sounding timing data. There is a practical limitation to the number of receiver and transmitters that can be deployed in any field setup. This embodiment uses a phase coherent transmitted "chirp" that can be created using a plurality of transmitted frequencies. The chirp signal can be created from frequencies that are changed at discrete intervals in time or continuously varying over time. A phase coherent transmission requires that both the transmitter and receivers are coherent with the same low drift synchronizing clock, such as an atomic clock or a GPS synchronizing clock.

Continuing with this embodiment, the combination of a multi component CSEM receiver and transmitter layout on the surface coupled with a plurality of transmitted frequencies will provide a data set of sufficient size and geometric locality to allow the creation of an interferometric image of subsurface formations. The technique of Astronomical Interferometry is modified and re-applied to a subsurface far field image plane. In addition, through the application of phase steering and the concept of phase focusing, a complete set of overlapping images may be created through the entire sub surface structure. The invention allows for the gathering of data into 1D, 2D, 3D and 4D imaging. The concept of 4D imaging is simply a plurality of images taken over successive time intervals.

The transmitter as defined by U.S. Provisional Pat. No. 61/648,305 can be implemented as a class D amplifier. The transmitter in this configuration is further capable of transmitting a range of sinusoidal waveforms that provide for the transmission of pure tone chirps. These types of waves are used in more traditional GPR and IFSAR systems and have application in the envisioned system.

Referring to Table (1) for nomenclature. The quasi static limit is assumed for the ELF and ULF electromagnetic signals. The basic physical principle used in the implementation of this technique is that boundaries of different subsurface materials that have different electrical properties will result in a complex interaction that consists of reflected, transmitted and absorbed energy when illuminated with the envisioned source radiation. The technique is the use of a form of Snell's law shown in equation (1)

$$\sin(\phi_c) = \sqrt{\sigma_T/\sigma_1} \qquad \text{eqn (1)}$$

where $\sigma_T$=is the conductance of the target layer
and $\sigma_1$=the conductance of the overburden layer
and the quasi static limit as defined within geophysical EM is valid for the ELF and ULF electromagnetic signals.

The relationship in equation 1 points to limits in angle of the incident radiation. Generally, for the ELF and ULF frequency range the largest angular displacement from the normal with respect to the target surface, will be 20 degrees depending on the conductivity ratio and frequency of transmission before total absorption of the illuminating source radiation. This angle is the critical angle and is different for each of the transmission frequencies. Maintaining the transmitter position on the surface, within the calculated angle to normal of the target formation surface and moving to new positions on the surface, will allow for penetration of the EM signal into and through the target formation. This leads to a new method of detecting multiple targets at different depths. In addition, moving the transmitter through the calculated angular limits leads to a new method of determining formation limits and shape by using the process of detecting signal nulls throughout the receiver array.

Referring to FIG. 1 the signal geometry 100 consists of a dipole source 105 that is oriented perpendicular to the target area 110 that is to be imaged, offset by an amount appropriate in order to illuminate the target area with the source radiation at or below the critical angle 115, for the selected frequency and formation type. Since there is a wide radiation distribution pattern (beam pattern) from the dipole source 105, the receiver array 120 is sized and placed on the earth's surface 125, to image primarily only the image object in the target surface 110, by taking advantage of the lambertian and specular reflection 130, from the target surface 110. The image object in the target surface 110, is shown as rectangular in shape, but any reasonable shape can be achieved by modifying receiver array 120's shape. The image object in the target area 110 is in effect the mirror or reflector of the receiver array shape in the receiver array 120, using combined specular and lambertian reflection assumptions.

Other aspects of the geometry 100 are the receiver dipoles of the receiver array 120, should be oriented roughly perpendicularly to the center line of the image object in the target area 110 for maximum signal response. Also, the depth 135, to target area 110, is sufficient that twice this depth is much larger than the linear spread 140 of the receiver array 120. This ensures that the critical angle 115 to the normal of the image object plane is small and that the received waves are planar in shape making for much simpler interferometric solutions. These restrictions are relaxed when the methods of phase steering and phase focusing are used.

In addition, the coordinate system used is defined by the arrows 145. The u and v coordinates are coincident with surface 110 and the receiver array 120. The w coordinate is defined as the direction perpendicular to both the u and v coordinates.

A further system limit can be described by the wavenumber for various sub-surface conductivities. Analysis shows that the wavenumber is:

$$R(k) = \sqrt{\frac{\omega\mu\sigma}{2}} = 2\pi/\lambda \qquad \text{eqn. (2)}$$

so that $$\lambda = \frac{2\pi}{\sqrt{\frac{\omega\mu_o\sigma}{2}}} = \sqrt{\frac{4\pi}{\nu\mu_0\sigma}}$$

Using equation 2, the wavelength range that is usable for the technique can be found for frequencies and conductivities of interest. In addition the range of typical phase velocities for various frequencies and conductivities of interest can be found A further limit to be considered is the skin depth. This is given by:

$$\delta_i = \sqrt{2/\omega\mu_0\sigma_i}, \qquad \text{eqn. (3)}$$

Using equation 3, the skin depth in km for various frequencies and conductivities of interest can be found. The values of skin depth indicate that at the higher frequencies the system envisioned must be capable of recording signals form several skin depths away.

The equations (1), (2) and (3) define one set of limits within which the disclosed subject matter will operate. The enhancement in sensitivity for amplitude and phase will result in readings from multiple skin depths that will allow the implementation of interferometric signal processing.

The Two-Element, Quasi-Monochromatic Interferometer

Figure 2:
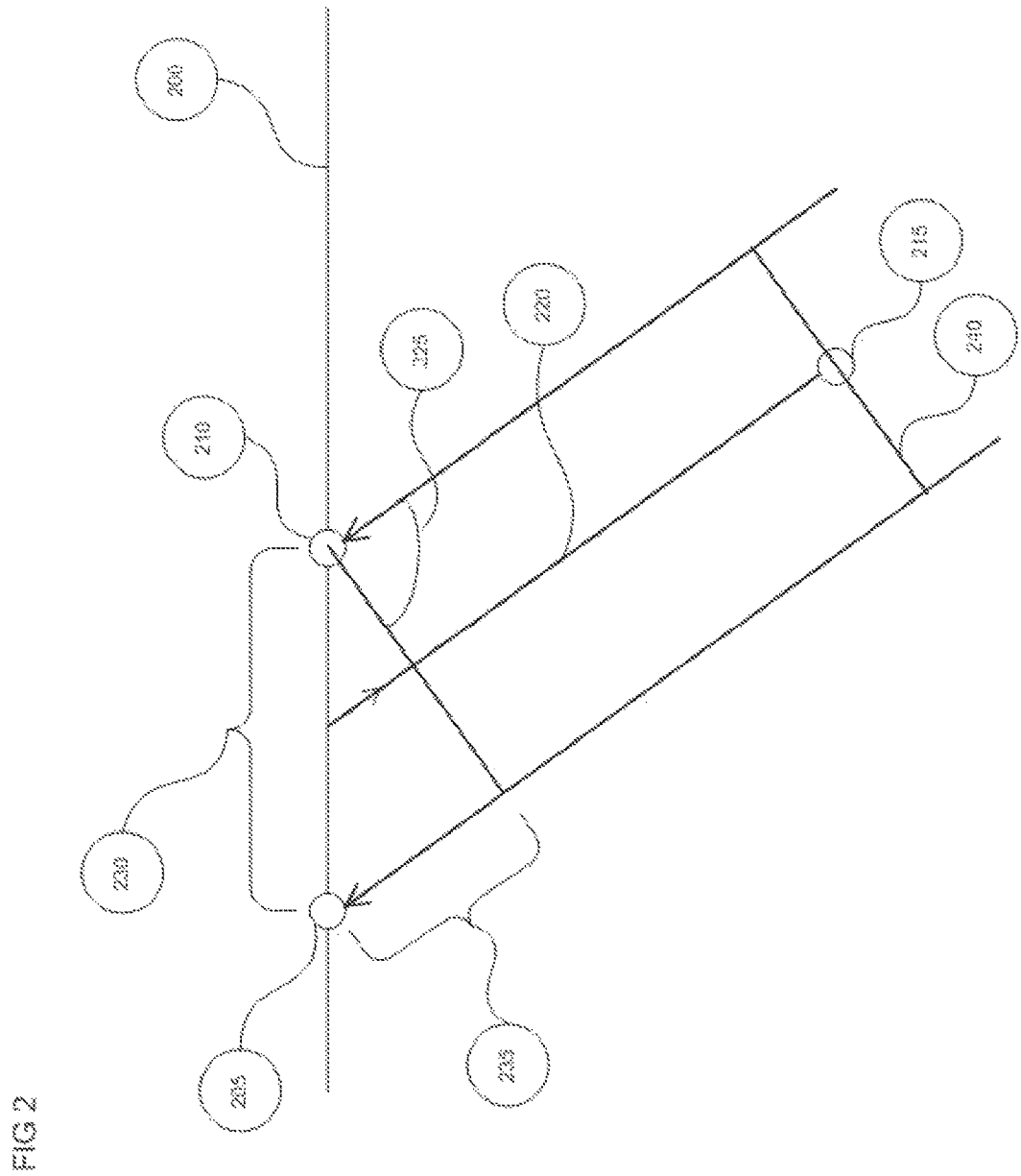
FIG. 2 depicts a simple, two element, quasi-monochromatic interferometer according to an embodiment of the disclosed subject matter.

Referring to FIG. 2. It is useful to explain the disclosed subject matter by specifying a simple model. The receivers 205 and 210 are placed a known distance 230 apart on the surface 200, quasi-monochromatic interferometer 210 and its response to a point source 215 can be considered and then aspects of the system related to finite band width and extended sources will be added. The simple model depicted in FIG. 2 is extensible to 3D.

The two receivers 205 and 210 obtain signal from a single point source 215 located along the source unit vector $\vec{S}$ 220 at an angle $\theta$ 225 off of the baseline vector $\vec{B}$ 230. The baseline vector 230, can also be expressed in wavelengths as:

$$\vec{b} = \vec{B}/\lambda.$$

The geometric time difference (due to the geometric distance difference) between a signal arriving at the right-most 210, and the left-most receivers 205 is labeled $\tau_g$ 235 and it is required the source be coherent over the geometric distance labeled by this $\tau_g$ 235 for interferometric work. Also, the point source 215 must be sufficiently far from the receivers such that the incident waves 240 have insignificant wave-front curvature and are therefore effectively plane waves over the distance between the two receivers 205 and 210. The geometric time delay can be expressed as:

$$\tau_g = B \cdot \cos(\theta)/v_p = \vec{B} \cdot \vec{S}/v_p \qquad \text{eqn. (4)}$$

where $v_p$ is the phase velocity of the wave in question.

Referring to Eqn. (4), the expression for $\tau_g$ is of great importance (the signals from the two receivers 205 and 210 are out of the plane of this simplified example). Because of the dot product of the two vectors $\vec{B}$ and $\vec{S}$ there is axial symmetry about the vector $\vec{B}$ and the paths of equal geometric time delay between the receivers 205 and 210 form circles centered on the baseline vector 230.

Analyzing the signals from the two receivers 205 and 210, the voltages produced by the dipole receiving antennae and labeling the right-most receiver 210, 1 and the left-most 205, 2, then:

$$V_1 = E\cos(\omega t) \text{ and } V_2 = E\cos(\omega t - \tau_g) \qquad \text{eqn. (5)}$$

Eqn (5) demonstrates that $V_2$ is retarded in time by the amount $\tau_g$. A signal is produced that can be used in a correlator. Anyone skilled in the art of astronomical interferometry will understand the concept of a correlator.

Interferometric Signal Processing

The disclosed subject matter includes a receiver and processing unit that produces a signal in an infinitesimal bandpass, and effectively a Fourier transform of the signal has been obtained by a suitable time-frequency transform, even if the signal has come about by using a band-pass filter within the receiving and processing electronics. The first task of the correlator is to multiply these two voltages together and average them over a suitably long time; several periods for each frequency band of interest. The output of the correlator is then;

$$R_C = \langle \cos(\omega\tau_g) + \cos(2\omega t - \omega\tau_g) \rangle = \langle \cos(\omega\tau_g) \rangle \qquad \text{Eqn. (6)}$$

In Eqn (6) the latter equality is due to the averaging of the temporal cosine function over multiple periods yielding zero. The quantity $R_C$ refers to the cosine result. The output of the correlator $R_C$ is such that it effectively projects circular rings on the image plane with an alternating cosine response function. Again, the circles are centered on the baseline of the interferometric pair, with a spacing or periodicity depending on $\omega\tau_g$. Many engineering factors influence the received signal, but the effects can be removed or reduce through calibration of receiver and transmitter.

Since the $R_C$ correlator in Eqn. (6) is an even function, an odd correlator function is required so that any function in the image plane can be fully imaged. The odd, sine correlator is produced introducing a $\pi/2$ phase shift into one of the receiver lines, thereby producing the $R_S$ correlator as follows:

$$V_1 = E\cos(\omega t + \pi/2) \text{ and } V_2 = E\cos(\omega t - \tau_g)$$

Now the time-average product of the band-pass limited signals $V_1$ and $V_2$ becomes;

$$R_S = \langle \sin(2\omega\tau_g) + \cos(2\omega t - \omega\tau_g) \rangle = \langle \sin(\omega\tau_g) \rangle \qquad \text{eqn(7)}$$

Eqn (7) is the odd correlator.

From Eqn (6) and Eqn (7) the even and odd correlator outputs a complex quantity known as the complex visibility V can be constructed as;

$$V = R_C - iR_S = Ae^{-i} \quad \text{eqn. (8)}$$

Where $A = \sqrt{R_C^2 + R_S^2}$ and $\tan(\ ) = R_S/R_C$.

The Extended Source

The disclosed subject matter uses an extended source such as the image plane or image object. This is the sum of the radiation from all point sources making up the object. For an extended source with radiance or specific intensity given by $I_v(\vec{S})$ the system response will be:

$$R_C = \iint I_v(\vec{S}) \cdot \cos(\omega \vec{B} \cdot \vec{S}/v_p) d\Omega \quad \text{eqn. (9)}$$

With the relation in Eqn (9), a relationship for the complex visibility as:

$$V_v(\vec{B}) = \iint I_v(\vec{S}) e^{-2\pi i v \vec{B} \cdot \vec{S}/c} d\Omega \quad \text{eqn. (10)}$$

One can see this is getting very close to a Fourier Transform pair between the quantity wanted $I_v(\vec{S})$ which is the amount of radiation as a function of position and our observable $V_v(\vec{B})$, the complex visibility. It remains to find the proper coordinate system for expressing these two quantities and then fully revealing the transform between these variables. First, however, we should talk about relaxing the quasi-monochromatic assumptions so that we can determine the effects caused by the necessarily finite bandwidth of any receiver electronics.

Finite Bandwidth Effects

Given a complex band response function G(v) we can integrate the complex visibility over a finite bandwidth $\Delta v$ centered at $V_0$ and find $$V(\vec{B}, v_0, \Delta v) = \iint \left[ \frac{1}{\Delta v} \int_{v_0 - \Delta v/2}^{v_0 + \Delta v/2} I(\vec{S}, v) G(v) G^T(v) e^{-2\pi i v \tau_g} dv \right] d\Omega$$

Now, if the source intensity is constant over the small bandwidth, the result of finite bandwidth is to introduce the Fourier Transform of the complex band response function into our complex visibility. For example, if we have a square bandwidth, we find;

$$V(\vec{B}, v_0, \Delta v) = \iint I_v(\vec{S}) \cdot \sin c(\tau_g \Delta v) e^{-2\pi i v_0 \tau_g} d\Omega$$

Also, for a Gaussian band profile, we introduce a Gaussian response to the quantity $\tau_g \Delta v$. The functional form of the Fourier Transform of the band response function is called the fringe washing function, which since:

$$\tau_g = \vec{B} \cdot \vec{S}/v_p = B \cdot \cos(\theta)/v_p$$

gives a maximum response at the horizon and diminishing response as the transmitter probes down at steeper angles. For the selected geometry, the system will always be imaging downward so the fringe washing function can create havoc with the interferometric technique, if the quantity $\tau_g \Delta v$ is large. However, this can be mitigated by "phase steering" which allows movement of the "phase center" away from the horizon toward the center of our image object, then the fringe washing function becomes a function of the angle off of the vector pointing toward the phase center. Even so, for large image areas and large bandwidths, the fringe washing function forces yet another engineering trade space over which to design the system's imaging geometry.

The coordinate system used in Interferometric Imaging can be used to explain the importance of receiving antenna layout. The following defines the coordinate system adopted:

Adopting the center point between the two antennae of a two-point interferometer as their effective location and utilize a u, v, w coordinate system to express their positions. We let u and v reside in the plane of the antennae, the Earth's surface in the example geometry, and allow w to extend vertically into the ground. Also, u, v, w are expressed in wavelengths of the bandwidth center frequency considered so that:

$$\vec{B} = (\lambda u, \lambda v, \lambda w) = (\lambda u, \lambda v, 0)$$

The direction cosines of the unit vector $\vec{S}$ are expressed in our coordinate system as l, m, n from which we can express the link between the radiation emanating from our target as;

$$V_v(u, v) = \iint \frac{I_v(l, m)}{\sqrt{1 - l^2 - m^2}} e^{-i2\pi(ul + vm)} dl \, dm$$

This identity represents a Fourier transform pair as given by:

$$\frac{I_v(l, m)}{\cos(\theta)} \Leftrightarrow V(u, v) \quad \text{Eqn. (11)}$$

Eqn. (11) establishes the connection between our observable, the complex visibility, and the image we desire, as a Fourier transform pair between the coordinates (u,v) for the positions of our interferometers and (l,m) the direction cosines projected on the image plane and measured off the center of our image object. To retrieve the image, we utilize the inverse Fourier transform as:

$$I_v(l, m) = \cos(\theta) \cdot \iint V_v(u, v) e^{i2\pi(ul + vm)} du \, dv \quad \text{Eqn. (12)}$$

Eqn. (12) expresses the link between our observables, the complex visibility or the individual $R_C$ and $R_S$ correlator outputs as measured in the (u,v) coordinate system and the image intensity as measured in the (l,m) coordinate system.

Interferometric Imaging with Antenna Arrays

Referring back to FIG. 1. The output of any two-element interferometer represents a single point in the (u, v) plane 145, this measure samples only one spatial wavenumber. The Fourier transform of a delta function is a sine (or cosine) wave, we end up with our sine (or cosine) fringes superposed upon our image plane. This results in considerable uncertainty in the underlying image object but as multiple interferometers are added, the system samples more and more of the (u, v) plane and thus localize emission from across the image with increasing certainty. This is reflected in the point spread function ("PSF") created by any number of interferometers. This leads to the concept of either having multiple transmitters or moving a transmitter to multiple locations or towing a transmitter through the area of interest. An equivalent effect in astronomy is obtained from the rotation of the planet.

Figure 3A:
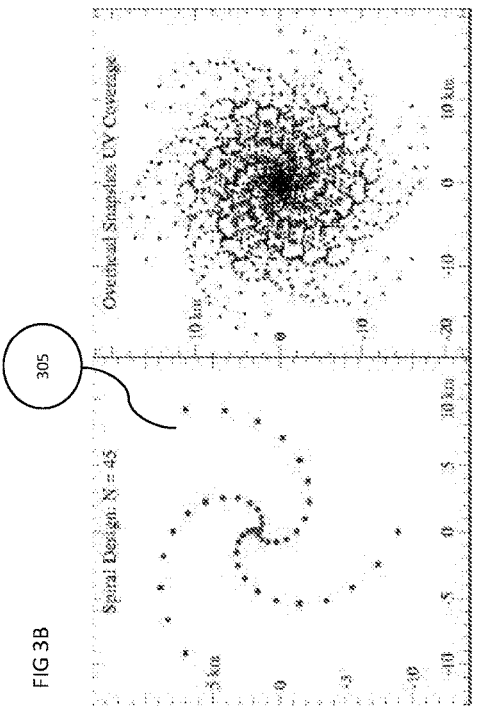
FIG. 3 depicts various receiver layouts and their effect on field coverage according to an embodiment of the disclosed subject matter.
Figure 3B:
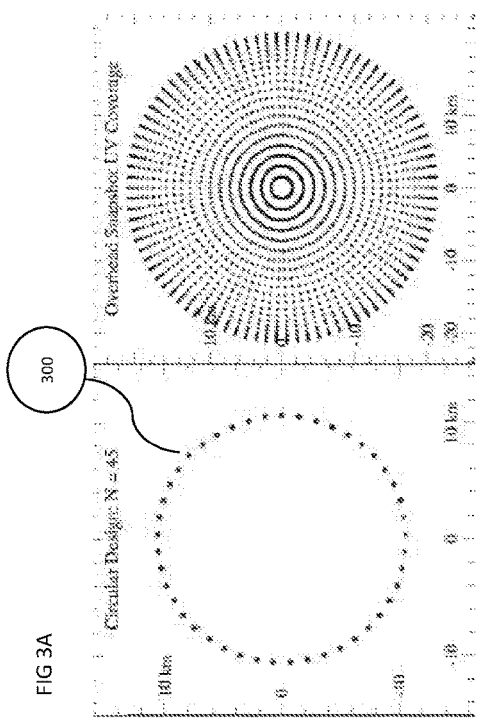
Figure 3C:
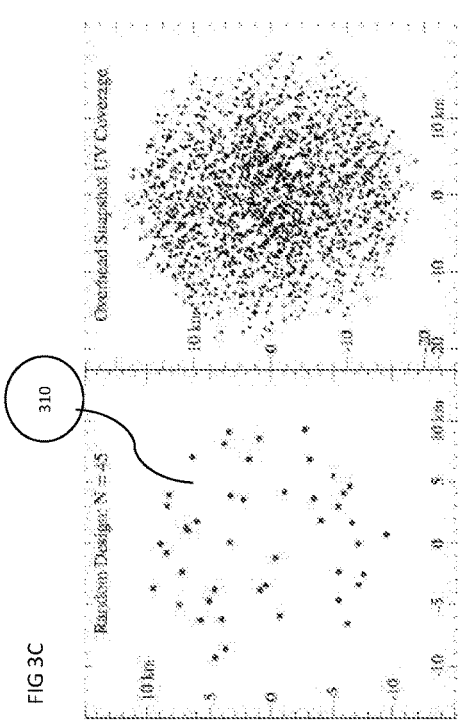

Note that for any N antennae, N (N−1)/2 two-point combinations can be formed, or (u, v) samples, which greatly improves (u, v) plane coverage. Also, if any two, two-point combinations are identical, there is no additional spatial information retrieved, so astronomical arrays often use variables spacing for example, the Very large Array or VLA uses logarithmic spacing. Other possible array designs are shown in FIGS. 3a, b and c.

It is importance to note the link between (u, v) coverage and the restored image resolution. Referring to FIG. 3a, examination of the circular array configuration 300, shows that it yields a hole in the center of the (u, v) coverage, which translates into a lack of information on the largest spatial image scales (i.e. large structures would fail to be imaged). However, its large (u, v) coverage would allow resolution of fine-scale details. The spiral array 305, offers the opposite combination with excellent large-scale structure (excellent (u, v) coverage near the origin), but poorer small-scale image detail. The random array 310, offers random (u, v) coverage with good resolution at all spatial scales.

Even with multiple transmitter locations providing a greatly enhanced coverage of the (u, v) plane, the imagery produced by the direct Fourier transform will still be referred to as a "dirty image" produced by a dirty beam. This is because the multitude of overlapping Fourier projections still produces a point spread function with considerable energy outside the central point. As a result, dirty images need to be deconvolved with the point spread function (as a function of position within the image) to produce the highest quality clean image.

The interferometric method of the Fourier transform is used to link 2-Dimensional observing coordinates (u, v) in the plane of the Earth, with the image coordinates (l, m) on the image plane. Since there is a physical limitation on the possible locations a set of imaging requirements will be designed for an optimal array and imaging modality.

Another aspect of the Fourier transform of importance is that all calculations within the correlator are done over a sufficiently narrow bandpass filter. The signal and/or signal power within this bandpass filter is the Fourier transform of the temporal signal, so that even though we need not take a Fourier transform to split our signal into band passes, this can be done electronically using bandpass filters and in the current embodiment is produced directly from the electronics, essentially working with another Fourier transform between the time and frequency domains. The fringe washing function is one aspect of the Fourier transform function and also forms a crucial link between astronomical interferometric imaging in 2D and subsurface interferometry allowing full volume imaging in 3D. The connection between astronomical and subsurface interferometry can be better understood by reviewing the mathematics of correlations and convolutions.

Signal correlation and convolution is used to link astrophysical with the geophysical interferometry. The time-domain signal is represented using a lower case letter f(t) and its Fourier transform pair with a capital letter as F(ω). The two are linked by a Fourier transform as f(t)⇔F(ω). Correlation is used to detect a given pattern within a longer scale signal, while the convolution gives the resultant signal of an input signal operated on by a system response. An example of the latter is when an image object is convolve with the point spread function of an imaging system, to determine the image that system will produce when looking at that perfect image object. The symbols f*g will denote the convolution of f with g and the symbols f⊗g for the correlation of f and g. Then for the convolution the following:

$$h(t)=f(t)*g(t)=\int f(\tau) \cdot g(t-\tau)d\tau$$

The Fourier transforms of these quantities are related by:

$$H(\omega)=2\pi F(\omega)G(\omega)$$

In the Fourier domain, the convolution is equivalent to the multiplication of the Fourier transform functions. Representing the Fourier transforms in polar notation, the following:

$$F(\omega)=F_0(\omega)e^{iF(\omega)} \text{ and } G(\omega)=G_0(\omega)e^{iG(\omega)}$$

The convolution is given by:

$$H(\omega)=2\pi F_0(\omega)G_0(\omega)e^{i(F(\omega)+G(\omega))}$$

In polar notation, convolution multiplies amplitudes and adds phases. If the phase of a function is generate by propagation along a path, then the convolution of two functions results in a function that represents propagation along the sum of the two separate paths.

For the correlation the following:

$$h(t)=f(t)\otimes g(t)=\int f(\tau)g(t+\tau)d\tau$$

The correlation is the convolution with one function time reversed, or:

$$h(t)=f(t)\otimes g(t)=f(-t)*g(t)$$

Then the Fourier transforms for these correlations are simply:

$$H(\omega)=2\pi F^*(\omega)G(\omega)$$

Here, the superscript * on the function F*(ω) represents the complex conjugate of that function. In this case, using polar notation, for these correlations the following:

$$H(\omega)=2\pi F_0(\omega)G_0(\omega)e^{i(G(\omega)-F(\omega))}$$

The correlation subtracts the phases of the functions. In this case, when the phase is introduced by path propagation, the correlation of two signals produces a signal representing propagation along an intermediate path between the two originals. The result is important to the disclosed subject matter.

Near Field and Far Field Focusing

The derivation so far has dealt with a far field approximation that is typical in astronomical interferometry and modified to fit the specific set of requirements for subsurface ELF and ULF interferometry. In sub-surface ELF and ULF interferometry near field objects also produce signal returns. The signals from near field objects are defocused and only contaminate the imagery the way nearby objects are blurred in a photographic image. Using a form of "phase focusing" similar to phase steering, the technique will provide the ability to cut depth slices out from the 3D volume. The technique would essentially defocus both the nearer and farther fields, so that a full volumetric image can be built up. Discrete steps are not required, where the volume is segmented into slices layered one upon the other, but can be done continuously so that successive slices significantly overlap their neighbors and allow a phase focusing in 3D. This technique is related to the phase steering used to move the phase center of an image off the horizon and into the center of the image object of interest.

An important aspect of the current invention is that the near field can be thought of as an opaque medium that defocuses the target formation.

In a second embodiment the interferometric system can use a technique of phase steering modified to produce phase focusing. The concept of phase steering is well understood in Radar Phase Array Antenna's. In the disclosed subject matter the phase steering is achieved by treating the receivers as transmitters and using the phase shifts between each to refer back to the object. This is also a well understood technique. The implication of using phase steering is that the invention must be capable of producing data from the receiver matrix that can be phase unwrapped or has a method for directly measuring phase.

Phase focusing is distinct from the process of phase steering in that instead of introducing the same phase shift for a receiver pair, a different phase shift for each is introduced such that the phase center for the receiver pair is adjusted toward a focal point.

Referring now to FIG. 4a. For a series of irregularly place receivers 405a, 405b and 405c on the surface 400 it can be seen that there are a series of phase nulls as defined by 410 for +2π, 415 for +π, 420 for 0, 425 for −π and 430 for −2π. The phase nulls are the same for receivers 405b and 405c.

Referring now to FIG. 4b. In the process of phase focusing instead of introducing the same phase shift for each pair of receivers as is the case for phase steering, a specific phase shift, resulting in an angular deviation 435 and 440 from the phase center, for each receiver pair is introduced in order to steer the two antenna pattern of phase nulls to the focal point 445 in subsurface space desired. In practice the determination of a particular focal point will depend on phase shifts caused by the interfaces between intervening materials.

A further limit for measuring wave front transition times from reflective interfaces as defined by Eqn. (1) is that the phase velocity varies with formation type and can be quite complex and is anisotropic for the materials in question. The third and fourth embodiments provide techniques to create information for the phase velocities through the intervening structure.

A third embodiment uses a transmitted phase coherent PRB code designed to allow investigation of conductance and therefore phase velocity through the near field regime to intermediate field regime. Knowledge of the phase velocity in the upper strata will improve the likely hood of a unique solution to an image created through phase differences. Other codes are possible. The concept of near, intermediate and far field regimes within CSEM surveying can be understood by a person skilled in the art of CSEM surveying. The concept of a PRB code can be understood by a person skilled in the art of spread spectrum transmission schemes.

In one embodiment the depth information is collapsed to a single image plane, depicted in FIG. 1. A set of image planes are created at each conductive interface. Depth information can be recovered by using the Radar sounding timing technique of the fourth embodiment.

In a fourth embodiment, Radar sounding timing data can be found as follows: The transmitter transmits at a fixed rate with a transmit time synchronized to the GPS synchronizing clock. A plurality of receivers is also synchronized to the GPS synchronizing clock. By the framing method, a receiver is able to detect EM transit times from the transmitter to a responding formation and back to the receiver antenna. The transit time is defined as follows:

$$T = D_{t \to f}/c * V_p + T_d + D_{f \to r}/c * V_p$$

Where:
T=transition time
$D_{t \to f}$=Distance from transmitter to target formation
$D_{f \to r}$=Distance from target formation to receiver
c=velocity of the EM signal in a vacuum
Vp=Velocity of propagation of EM signal in the formation
Vp can be resolved by collecting data at multiple frequencies within multiple receivers and solving a matrix of linear equations by way of the differing transit paths. In addition, the technique of transmitting PRB codes can be used to directly measure phase velocities in the near field regime.

A fifth embodiment allows for the use of a burst transmission mode. A burst mode consists of transmitting one or more pulses at the transmission frequency followed by one or more periods at the transmission frequency with no power being transmitted. This enables the system to record reflected signals and implement Radar sounding timing data collection.

The concept of reciprocity between receivers, transmitters and the image plane is important to all described embodiments. A person skilled in the art of astronomical interferometry will understand the concept of reciprocity between receivers, transmitters and the image plane.

In order to create subsurface Radar sounding timing and interferometric images the receiver systems must be able to detect small phase shifts and amplitude changes from the source signal through phase coherence.

To achieve high precision with available electronics, the disclosed subject matter uses the additional step of a data framing technique that is defined by an image accumulation algorithm and a file system that records data in well-defined phase offsets from the transmitted pulse. The framing technique creates data samples that are phase coherent and precisely timed with the transmitter.

Figure 5:
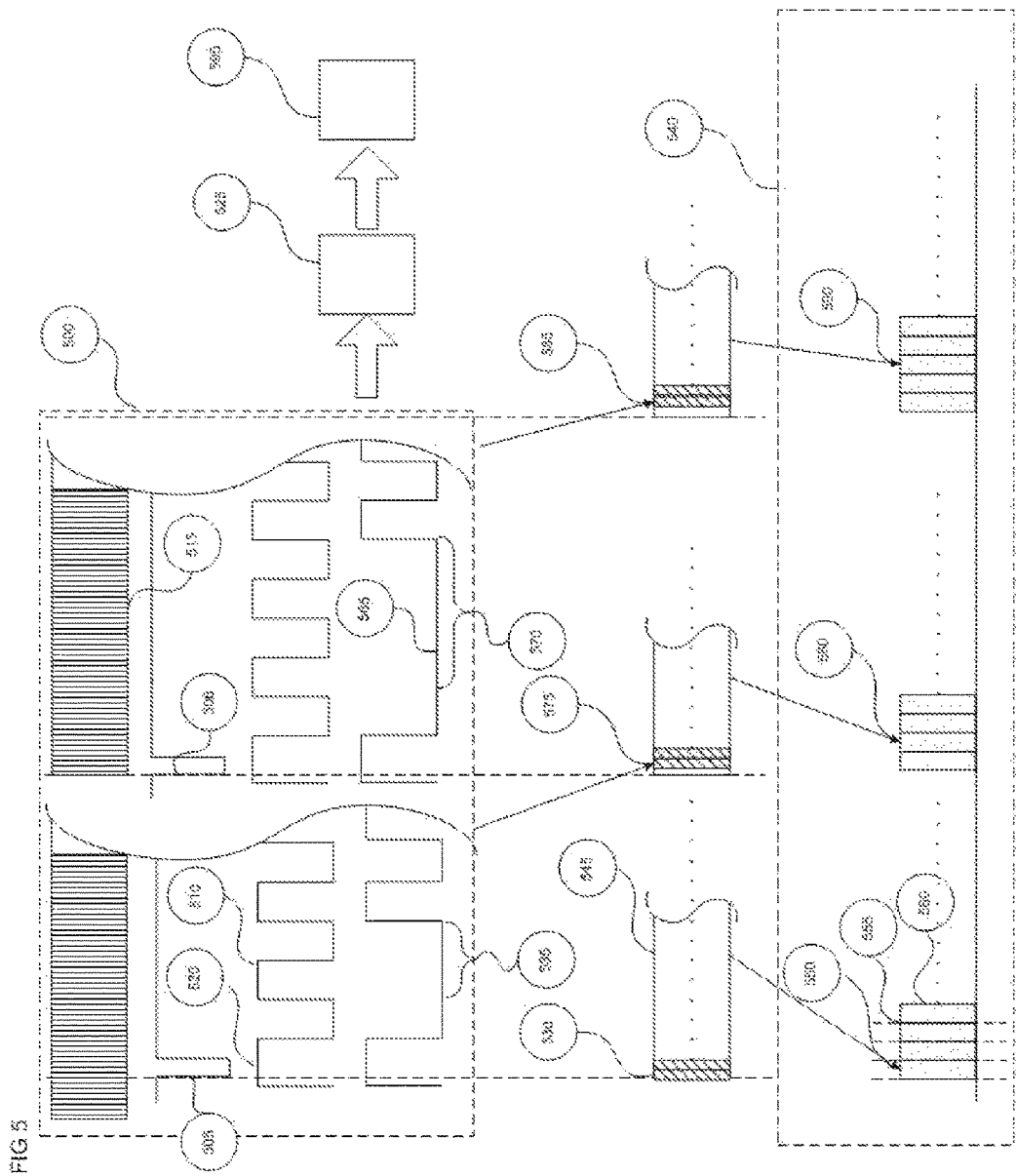
FIG. 5 depicts the envision data framing technique for increased phase resolution according to an embodiment of the disclosed subject matter.

Referring now to FIG. 5. In an embodiment a clock management system 500, is used to implement phase alignment of the ADC clock 510 output with an atomic clock pulse or GPS synchronizing clock pulse that is the phase alignment pulse 505. The clock management system 500 can be implemented using off the shelf components or through an appropriately programmed high speed CPLD or similar device. Such methods and systems are disclosed in U.S. Pat. Pub. No. 2012/0010818 filed on Jul. 7, 2011 and which is hereby incorporated by reference and U.S. Provisional Pat. No. 61/648,305 filed on May 17, 2012. The clock management system 500 accepts an incoming phase alignment pulse 505 that is global to the system. The phase alignment pulse 505 must repeat at a rate that is faster than the time it takes for the ADC clock 510 to drift one clock period of the ADC clock 510. The repeat rate for the alignment pulse 505 is controlled by the drift of the system clock 515. The system clock 515 must have a much higher frequency than the clock to be synchronized to the phase alignment pulse 505. At the occurrence of each phase alignment pulse 505 the clock management system 500 introduces enough high speed clock pulses from the system clock 515, to re-align the ADC clock 510 to the phase alignment pulse 505. This process ensures that the ADC 525 produces data samples 520 that are aligned to the phase alignment clock 515. There are other techniques available for the phase alignment process.

Once the ADC clock 510 is aligned to the phase alignment pulse 505 then the clock management system 500 can be used to create a controlled phase shift in the ADC 525 data sample 520 output.

In one embodiment the ADC 525 is a Delta Sigma ADC. Within the ADC 525 there is a state machine that consists of a number of process steps that produce a data sample at the completion of the steps. The disclosed framing technique takes advantage of the state machine process by delaying a single step in that process. The steps occur at the ADC clock 510, rate. The number of steps required to produce a data sample may vary from device to device but this does not change the outcome of the disclosed process of the framing technique. For example, the number for the selected ADC 525 is 512 in order to obtain a data sample 530. The clock management chip 500 delays a single ADC clock period 535 resulting in a sample that is delayed at the output of the ADC 525 by one clock period of the ADC clock 510. The clock management system performs this step on a regular basis. In the example the rate is once per second although this maybe at any desirable rate. In the subsequent periods additional pulses are removed from the ADC clock pulse train, in sequence. So, for the second period the ADC 525 data output is delayed 565 by two ADC clock pulses and the third period by three and so on. After 512 periods the process starts over again. It is also possible to delay by larger numbers of ADC clock 510 pulses. In the bulk memory module 540 the first data sample 530 is at phase $\phi_0$. The ADC 525 continues to output data with the phase $\phi_0$ relative to the phase alignment pulse 505. The data is passed to the memory system 595 which contains a bulk memory module 540. The data collected before the next phase alignment pulse 506 is stored in the bulk memory module 540 at 550. At the occurrence of the next phase alignment pulse 506 that occurs on a 1 second boundary the data sample 575 is at $(\phi+\Delta\phi)$ where $\Delta\phi$ is equivalent to the delayed pulse period of 535. The data set collected before the next phase alignment pulse 555 is stored at 580 in the bulk memory module. Subsequent 1 second periods result in an increased value of $\Delta\phi$ that is proportional to the number of pulses that the ADC clock 510 is delayed. In the case of the third period the delay is 565 and the data is stored in the bulk memory module 540 with the time delay 570 at 580. Data is populated into a matrix of electric and magnetic field values plus phase of the arrived wave front at intervals $(\phi+\Delta\phi)$.

The number of shifts in time required is dependent on the phase velocity and wave length of the transmitted signal and the required phase accuracy. The currently envisioned system provides for a phase accuracy of 1 m Radian. For example; at 500 Hz in 0.001 S/m conductivity rock requires better than ~4 u seconds of timing resolution and an amplitude resolution of better than ~1 uV for an incident wave at the receiving antenna of 10 mV pk-pk.

Referring to FIG. 5, the pattern is repeated until the data matrix is full. One embodiment has a GPS phase alignment pulse 510 accuracy of +−200 n seconds. In order to take best advantage of the phase alignment pulse 510 accuracy the system will acquire 1.6 million samples in a frame at 50 KSPS. The number of ADC clock 510 pulses to delay per period is 16 giving a delta phase between $\phi_0$ and $\phi_1$ is 0.625 us. This results in 32 phase delays per frame of data. In this manner the aggregate sample rate of the system is increased by 32 fold.

The described method is preferred over the alternate of simply using the ADC synchronization pin, as most Delta Sigma ADCs then require some number of samples to restart the state machine and produce a sample. This may be as high as 128 samples. The result is a phase shift in the data set that is well within the frequency range of interest. The described method introduces phase shifts that are beyond the sample rate of the ADC and allow for continuous Direct Memory Access of the ADC to bulk memory providing for high data rates.

The timing resolution will produce spatial resolution that is dependent on the limiting factors defined by eqn. (1), (2) and (3). The total time required to collect data at this resolution is 32 seconds if shifting is done on a 1 second GPS synchronizing clock. Importantly, the accuracy is improved by including phase data from the formation signal.

In an alternative embodiment, the data framing technique step may be replaced by an ADC with sufficient speed, (for example: greater than 10 mega samples per second per channel) resolution (for example: greater than 22 bits of data) and with 2 or more channels of phase coherent data. (Although currently an ADC with this performance specification is not commercially available). It is also possible to collect data from a 16 bit ADC at a rate of 10 mega samples per second over an extended period and then average the data to gain the extra bits of resolution. Currently, there are only single channel ADC's available with this sample rate and a suitable scheme to replace the framing method would be difficult and expensive to create.

In an alternative embodiment the transmitter output is delayed by a small period relative to the GPS synchronizing clock and that period is increased atomically (e.g. a small amount every second) every GPS synchronizing clock pulse. As a result the transmitter output will shift in time or phase relative to the phase coherent receivers in the system. The result is the same as the data framing technique described above. The receiver system will still provide large data sets containing data frames but the receiver ADC clock will not be shifted in time relative to the GPS synchronizing clock. This technique can also be used to create phase steering of the transmitter signal in a plurality of transmitters by simply ensuring the delay in each transmitter pulse relative to the GPS synchronizing clock pulse is different as described below In the preferred embodiment a one or more transmitters is equipped with the phase alignment circuit to allow for the collection of phase coherent transmitter output voltage and current U.S. Pat. No. 3,993,999 Nov. 23, 1976 "Amplitude Modulation Scanning Antenna System" teaches us that through an arrangement of electronic elements that implement signal phase control that are connect to and transmit through, a plurality of antenna elements with each element having a phase delayed signal, results in a transmission wave shape that is directional where the direction is controllable. The process of phase alignment described herein allows for the implementation of just such a scheme using ELF and ULF ranges in the EM spectrum.

Figure 6:
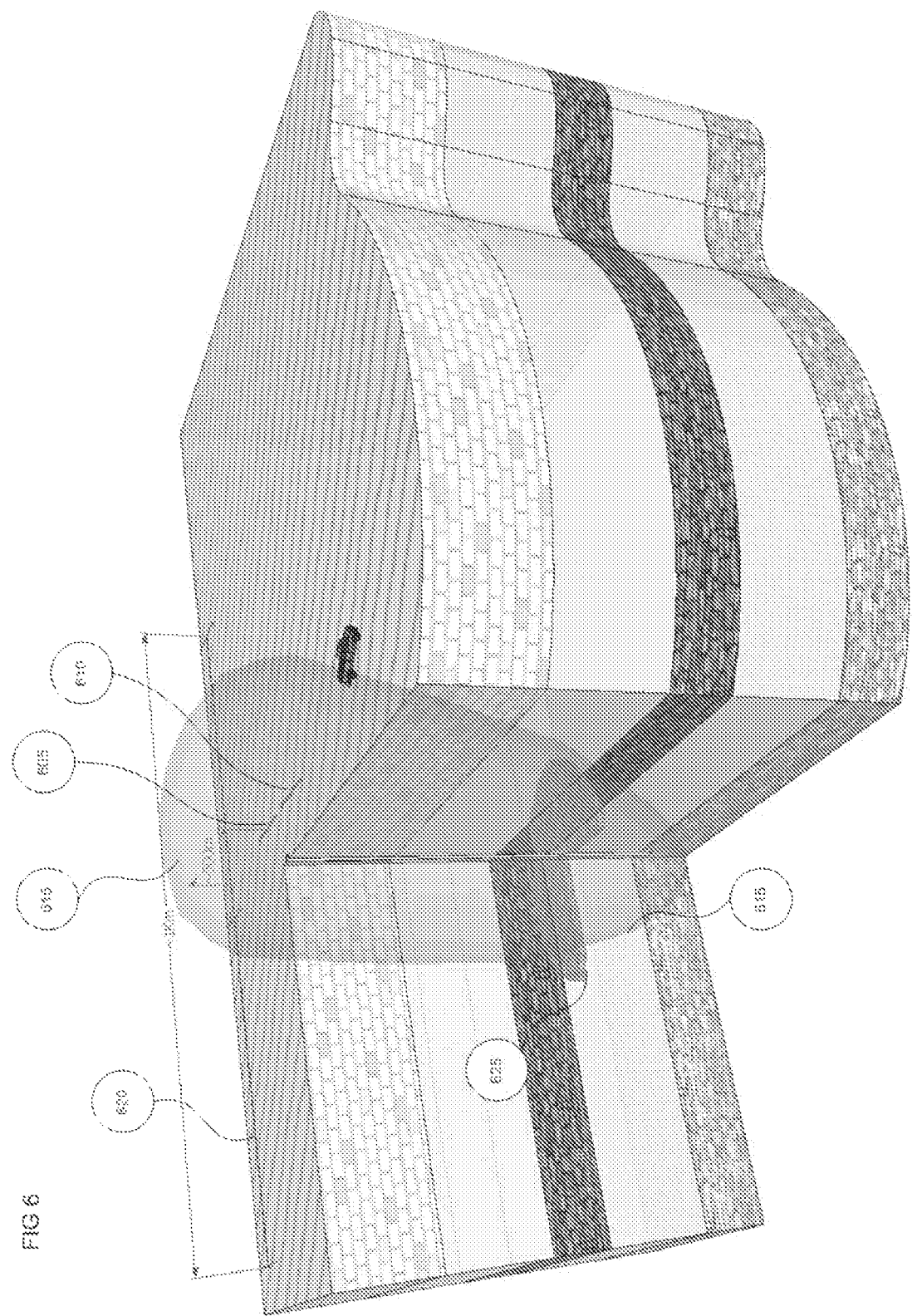

Referring now to FIG. 6. In another enhancement of the system allows the described transmitter and receiver system to be able to take advantage of a phased array antenna. The phase accuracy of the transmitter is very high and synchronized using the clocks as described in the provisional applications 61/366,916 and 61/362,241 and herein. Deploying a plurality of transmitter dipoles, arranged in a fixed geometry and using phase delayed transmission of the pulsed signal to each dipole, creates a modified wave front. In FIG. 6 a pair of transmitters 605 and 610 have the transmitted planar wave 615 modified due to phase delayed so as to create the modified wave front 615. There is gain of between 6-15 db, depending on the geometry and phasing, in the direction of the sub-surface geology 625. In addition altering the phase delay will allow the system to sweep the signal in azimuth. This technique has an analog in AM broadcast transmission. The result of this enhancement is reduced signal noise as a result of not stimulating structures of no interest, and increased signal power. In addition the airwave 615 is greatly attenuated at the receiver array 620. For example the transmitters 605 and 610 are each coupled to a 20 KW EM power supply. With 6 db of gain in the direction of interest the total transmitted power is 80 KW in the downward direction. This also provides for greater depth of signal penetration without the additional weight of a large transmitter. Subsequent processing of the data is faster and requires fewer external constraints, such as seismic data, because of the directional nature of the transmitter.

In a further enhancement the location and geometry of the transmitter dipoles can be arranged in such a manner as to allow for the creation of other wave front shapes that have focal points that are controlled by the location of the dipole and the phase delayed pulses to each dipole. This creates a phase array antenna that will produce a swept transmitted signal. In addition, it is important to use the full range of transmitting frequencies available to the system through the software controlled transmitter. Changing the transmitting frequency necessitates the alteration of the phase timing to each of the elements in the phase array antenna.

The method of sweeping the transmitted signal has the distinct advantage of reducing the required mathematics for the receiving electronics and processing computers to resolve a sub-surface image as the signal focal area is known during the sweep. The method further constrains the system.

In an alternate embodiment the transmitter pulse train is shifted in time relative to the phase of the GPS synchronizing clock and the receive ADC clock is not shifted. The same amount of data is required to be collected.

The techniques and methods disclosed herein will allow for the detection of fluid in subsurface structures. In particular the resolution of the InCSEM system will be such that fluid introduced in subsurface hydraulic fracing will be detectable.

In addition to monitoring subsurface fluids, the disclosed subject matter will have particular application to other aspects of the upstream activities and processes of the oil and gas industry, both onshore and offshore. Specifically, the disclosed subject matter will be of use to (1) "greenfield" exploration for hydrocarbon deposits, including the identification and characterization of hydrocarbon seeps; (2) established fields in seeking bypassed hydrocarbon deposits and optimizing well placements; (3) the management of production for established reservoirs so as to optimize hydrocarbon recoveries; (4) the planning for and operation of enhanced oil recovery processes (EOR); (5) the determination of gas hydrate deposits; and (6) the more accurate determination of oil & gas reserves.

The disclosed subject matter will also have application to the determination of geohazards associated with positioning offshore well platforms, pipelines and other infrastructure, as well as onshore ones.

The disclosed subject matter will also have application to other subsurface imaging requirements including geothermal facilities and acquirers.

The disclosed subject matter will also have application to the positioning and licensing of large high risk surface construction facilities such as atomic energy plants, dams, bridges, and skyscrapers.

The disclosed subject matter will also have application to the assessment of subsurface environmental degradation which may arise from leakage of fluids from fracking operations into acquirers or surface streams, rivers, or lakes, or from the subsurface placement of dangerous chemicals.

The disclosed subject matter will also have application to the assessment of risks from earthquakes and volcano eruptions.

The disclosed subject matter will also have application to finding mineral deposits that have differential electrical characteristics such as iron ore, nickel, diamonds, uranium and "rare earth" elements.

The disclosed subject matter will also have application to the determination of the properties of rock characterization, sometimes known as "rock physics." to evaluate and facilitate planning hydrocarbon drilling or mineral mining, which properties cannot otherwise be determined at a distance by seismic or other non-seismic technologies.

One skilled in the art, using this disclosure, could develop additional hardware and/or software to practice the disclosed subject matter and each is intended to be included herein.

Although described herein with reference to particular embodiments, any particular embodiment does not necessarily require every single element. Furthermore, particular elements from different embodiments may be combined and/or eliminated and remain within the scope of this disclosure. In addition to the above described embodiments, those skilled in the art will appreciate that this disclosure has application in a variety of arts and situations and this disclosure is intended to include the same.

TABLE 1

| Quantity | Symbol | Units |
| --- | --- | --- |
| frequency | f | $sec^{-1}$ |
| angular frequency | $\omega$ | $sec^{-1}$ |
| wavelength | $\lambda$ | m |
| wave number | k | $m^{-1}$ |
| permeability | $\mu$ | H/m |
| permittivity | $\epsilon$ | F/m |
| conductivity | $\sigma$ | S/m |
| resistivity | $\rho$ | $\Omega$ m |
| phase velocity | $v_p$ | m/s |
| skin depth | $\delta$ | m |
| Farad | F | |
| Siemen | S | |
| Henry | H | |

What is claimed is:

1. A method of subsurface monitoring via interferometric techniques using control source electromagnetic signals, the method comprising the following steps:

a. positioning at least one transmitter on a surface, said at least one transmitter positioned at an angle less than a critical angle with respect to a normal of a target structure, said critical angle dependent on each transmission frequency, said at least one transmitter additionally positioned such that transmissions are directed towards said target structure, said target structure beneath said surface, wherein said at least one transmitter are capable of transmitting one or more phase coherent chirps created using a plurality of said transmission frequencies;

b. positioning at least two receivers on said surface, said at least two receivers positioned such that said transmissions from said at least one transmitter are received by at least one of said at least two receivers, wherein said at least two receivers are capable of detecting small phase shifts and amplitude changes from chirps through phase coherence;

c. wherein said at least one transmitter and said at least two receivers are phase and/or time coherent with a low drift synchronizing clock;

d. recording data received by said at least two receivers in response to said chirps;

e. repeating steps a. through d. for a plurality of said transmission frequencies, said angles, and/or the positions on said surface; and f. creating at least one interferometric images of said target structure from said data using data framing, wherein said data framing creates data samples which are phase coherent and coherent with said low drift synchronizing clock.

2. The method of claim 1, additionally comprising the step of phase focusing, said phase focusing comprising introducing a specific phase shift resulting in an angular deviation from a phase center for said at least two receivers.

3. The method of claim 1, having at least two transmitters and additionally comprising the step of phase steering, said phase steering comprising introducing at least one phase shift to said at least two transmitters, wherein said at least one phase shift is the same increment for each of said at least two transmitters.

4. The method of claim 1, additionally comprising the step of phase steering, said phase steering comprising introducing at least one phase shift to said at least two receivers, wherein said at least one phase shift is the same increment for each of said at least two receivers.

5. The method of claim 1, additionally comprising the step of collecting and analyzing data from pseudo random binary code transmission thereby producing precisely located conductance values and from said conductance values creating corresponding phase velocities, wherein said step of collecting and analyzing data from pseudo random binary code transmission is also repeated according to step e.

6. The method of claim 5, additionally comprising performing radar sounding timing with respect to near field phase and intermediate field velocities thereby producing depth information, wherein said step of performing radar sounding is also repeated according to step e.

7. The method of claim 6, wherein the subsurface monitoring is conducted during a hydraulic fracturing or liquid petroleum gas sub-surface fracturing operation.

8. The method of claim 5, wherein said frequencies are over 0.25 Hz.

9. The method of claim 8, wherein said plurality of frequencies are changed at discrete intervals in time.

10. The method of claim 8, wherein said plurality of frequencies are continuously varied over time.

11. The method of claim 1, having at least two interferometric images and additionally comprising the step of creating a stack of said at least two interferometric images.

12. The method of claim 11, wherein said stack of said at least two interferometric images comprises three-dimensional imaging of said target structure.

13. The method of claim 11, wherein said stack of said at least two interferometric images comprises four-dimension imaging, wherein said four-dimensional imaging is three-dimensional imaging taken over one or more time intervals.

14. The method of claim 1, wherein one or more of said at least two receivers receive one or more of the following:
   a signal indicating a reflection; a signal indicating a null; or
   a signal returned as a result of seeing through a formation, said formation closer to said surface than said target structure.

* * * * *